United States Patent [19]

Ishizuka

[11] Patent Number: 5,396,286

[45] Date of Patent: Mar. 7, 1995

[54] VIDEO SIGNAL PROCESSING APPARATUS

[75] Inventor: Shigeki Ishizuka, Kanagawa, Japan

[73] Assignee: Sony Corporation, Tokyo, Japan

[21] Appl. No.: 70,957

[22] Filed: Jun. 4, 1993

[30] Foreign Application Priority Data

Jun. 9, 1992 [JP] Japan .................................. 4-174896

[51] Int. Cl.[6] .......................................... H04N 5/228
[52] U.S. Cl. ..................................... 348/208; 348/246
[58] Field of Search ............... 348/208, 246, 314, 304, 348/247, 154, 155, 311, 316, 241; H04N 5/228, 5/232

[56] References Cited

U.S. PATENT DOCUMENTS

| 4,647,978 | 3/1987 | Kinoshita et al. | 348/314 |
|---|---|---|---|
| 4,761,683 | 8/1988 | Matteson et al. | 348/283 |
| 4,783,702 | 11/1988 | Sone et al. | 348/314 |
| 4,819,072 | 4/1989 | Boucharlat et al. | |
| 4,959,725 | 9/1990 | Mandle | 348/208 |
| 5,253,071 | 10/1993 | MacKay | 348/208 |

FOREIGN PATENT DOCUMENTS

| 0276594 | 8/1988 | European Pat. Off. | |
| 0329189 | 8/1989 | European Pat. Off. | |
| 0454354 | 10/1990 | European Pat. Off. | |
| 8802971 | 4/1988 | WIPO | H04N 3/14 |

Primary Examiner—Michael T. Razavi
Assistant Examiner—Tuan V. Ho
Attorney, Agent, or Firm—Jay H. Maioli

[57] ABSTRACT

A video signal processing apparatus for correcting vibration effects in a video camera that has a CCD image pickup device having a number of lines greater than the number of lines of the standard NTSC television system. The lines used to generate the image are shifted during the vertical blanking interval to correct for vibrations of the video camera, and the overflow charges which are caused by transferring the CCD image pickup device at a high speed during the blanking period are absorbed into a semiconductor drain element arranged in parallel with the horizontal transfer register of the CCD image pickup device. Defective pixels in the image pickup device are compensated by storing the addresses of defective pixels and interpolating at those positions, during vibration correction the addresses of the defective pixels are shifted to correspond to the amount of vibration correction. A read clock and a write clock for the line memory that is used to perform the vibration correction in the horizontal direction are set to line-locked clock signals of different frequencies, thereby preventing deterioration of the picture quality upon vibration correction. The window used to detect optical information for automatic camera control is also shifted in accordance with the shift amount used to perform vibration correction.

2 Claims, 9 Drawing Sheets

VIDEO SIGNAL PROCESSING APPARATUS

BACKGROUND OF THE INVENTION

1. Field of the Invention

The present invention relates generally to a video signal processing circuit used in performing vibration correction for a video camera and, more particularly, to providing defective pixel compensation and optical detector window adjustment in accordance with the vibration correction.

2. Description of the Background

In recent years, the realization of a miniature lightweight video camera has progressed and today such a video camera can be fairly easily handled. On the other hand, in association with the miniaturization and lowered weight of the video camera, the video camera can be so easily moved that the photographing operation is readily influenced by camera movement and vibration. A video camera, therefore, having a vibration correcting feature has been proposed and put into practical use.

As a vibration correcting system for a video camera, there has been proposed a circuit in which an image pickup signal from an image pickup device is stored in a field memory, and the picture plane is enlarged and interpolated in the field memory. The reading out operation from the field memory is controlled in accordance with the vibration of the camera, and the vibration is corrected. Such a system is disclosed in U.S. patent application Ser. No. 673,783 assigned to the assignee of the instant application. Nevertheless, when the picture plane is enlarged and interpolated as described above, the resolution deteriorates.

There has also been proposed a mechanism in which a variable optical axis prism is arranged in front /f a lens, the prism is moved in accordance with the vibrations of the camera, the refraction angle of the incident light is changed, and the vibration is compensated. Such a system is disclosed in Japanese patent application number Hei 04-016968. According to such a vibration correcting mechanism, because the picture plane is not enlarged and interpolated, the picture quality is not deteriorated. Nevertheless, according to such a vibration correcting mechanism the variable optical axis prism must be mechanically moved. Therefore, the required mechanical structure becomes an obstacle to realizing a small sized and light-weight camera.

Further, there has been proposed a system in which the image pickup device of the camera has a number of lines greater than the number of lines of the standard television system, the picture plane is vertically moved by using the surplus lines which are available, and the vibration is corrected. This system is disclosed in U.S. patent application Ser. No. 978,366 also assigned to the assignee of the instant application.

In this latter system, for instance, a CCD image pickup device of the PAL system is used to output the video signal of the NTSC system. When the video signal of the NTSC system is generated by using the CCD image pickup device of the PAL system, because the number of lines of the PAL system is greater than the number of lines of the NTSC system, surplus lines are provided. The number and location of the lines in the CCD image pickup device is transferred at a high speed during the vertical blanking period. By changing the number of lines in the high-speed transfer with respect to the number of lines before and after the video frame time, the picture plane can be vertically moved.

Nevertheless, when such a vibration correction using an increase in CCD lines is executed, the high-speed transfer is executed during the blanking period, so that considerably large charges must flow from a vertical transfer register into a horizontal transfer register of the CCD image pickup device. Consequently, there occurs the problem that when a strong light is irradiated onto the CCD image pickup device, the charge amount exceeds the capacity of the horizontal transfer register and the overflow charges reverse flow into the vertical transfer register side.

Moreover, as a practical matter defective pixels are always included in the pixels of a CCD image pickup device. Hitherto, position information of the defective pixels is stored in a memory and processes such as interpolation and the like are executed at the positions of the defective pixels, thereby coping with the defective pixels.

As described above, when the image pickup device having a number of lines greater than the number of lines of the standard television system is used vibration correction is executed by vertically moving the picture plane by using the surplus lines which are available. Therefore, because the defective pixel information is fixed as addresses in a memory, when the video signal is moved to perform vibration correction the positions of the defective pixels do not correspond to the positions at which the defect correction is to be executed.

When the image pickup device in which the number of lines is larger than the number of lines of the standard television system is used, the vertical height of the image pickup picture plane is increased. Therefore, the image pickup signal is stored in a line memory and is time-base converted in accordance with a magnification ratio. By such time-base converting the image pickup signal, the picture plane is enlarged in the horizontal direction. Therefore, by shifting the enlarged picture plane in accordance with a vibration amount in the horizontal direction, the vibration in the horizontal direction can be corrected.

In performing the time-base conversion by using the line memory as mentioned above, there is considered a method whereby a write clock signal, and a read clock signal are set to the same clock and the same data is read out a plurality of times in accordance with the magnification ratio. After such multiple read out, the data is interpolated by an interpolation filter, however, when the interpolation filter is used the picture quality deteriorates.

Some video cameras have a window to detect optical information for performing automatic exposure control and automatic focus control. For example, automatic exposure control is executed by detecting a video signal level using the detection window and by setting an opening amount of an iris and a gain of an automatic gain control circuit (AGC) in accordance with the video signal level. As mentioned above, when the image pickup signal is stored in the line memory, the picture plane is enlarged in the horizontal direction, the enlarged picture plane is shifted in accordance with a vibration amount in the horizontal direction, and the vibration in the horizontal direction is corrected. Thus, the position of the window is deviated relative to the position of an object to be photographed. For example, when the position of the window coincides with the position over the object or is moved away therefrom due to vibration, although the amount of light in the window changes, the photographed picture plane is stationary due to the vibration correction. Therefore, a phenomenon occurs in which the brightness changes in spite of the fact that the picture plane is stationary.

OBJECTS AND SUMMARY OF THE INVENTION

Therefore, one object of the present invention is to provide a video signal processing apparatus that can prevent the reverse flow of charges to a vertical transfer register of an image pickup device when performing vibration correction.

It is another object of the present invention to provide a video signal processing apparatus that can make the actual positions of defective pixels in a video camera image pickup device correspond to the position of defective pixels after an image plane has been shifted due to performing vibration correction.

It is a still further object of the present invention to provide a video signal processing apparatus that does not cause deterioration of the picture quality when a time-base conversion in the horizontal direction is executed when performing video camera vibration correction.

It is another object of the present invention to provide a video signal processing apparatus for a video camera in which optical information is obtained from a window adapted to the picture plane to be actually photographed.

According to an aspect of the present invention, there is provided a video signal processing apparatus for correcting vibrations in a video camera, comprising: an image pickup having a number of lines in vertical direction that is larger than the number of lines of a television system to be output; a vibration amount detector for detecting a vibration amount in the vertical direction; a high-speed transfer control for transferring the image pickup at a high speed during a blanking period within a range of the number of surplus lines which is equal to the difference between the number of lines of the image pickup and the number of lines of the television system to be output in accordance with the vibration amount in the vertical direction obtained by the vibration amount detector and for correcting the vibration in the vertical direction; and a charge back-flow preventing device, arranged in parallel with a horizontal transfer register of the image pickup, for preventing a back flow of charges to a vertical transfer register upon high-speed transfer of the charges on the image pickup.

According to another aspect of the present invention, there is provided a video signal processing apparatus for correcting vibration in a video camera, comprising: an image pickup having a number of lines in the vertical direction which is greater than the number of lines of the television system to be output; a vibration amount detector for detecting a vibration amount in the vertical direction; a high-speed transfer control for transferring charges from the image pickup at high speed during a video blanking period within a range of the number of surplus lines that is equal to the difference between the number of lines of the image pickup and the number of lines of the television system to be output in accordance with the vibration amount in the vertical direction obtained by the vibration amount detector and for correcting the vibration in the vertical direction; a memory for storing pixel defect location formation for each of the pixels that are arranged in the image pickup; and a defect corrector for correcting defects in accordance with the defect location information and the number of lines that are transferred at high speed for vibration correction, thereby correcting defects.

According to still another aspect of the present invention, there is provided a video signal processing apparatus for correcting vibrations in a video camera, comprising: an image pickup having a number of lines in the vertical direction that is greater than the number of lines of the television system to be output; a vibration amount detector for detecting vibration amounts in the horizontal and vertical directions; a high-speed transfer control for transferring the charges on the image pickup at high speed during a video blanking period within a range of the number of surplus lines which is equal to the difference between the number of lines of the image pickup and the number of lines of the television system to be output in accordance with the vibration amount in the vertical direction obtained by the vibration amount detector and for correcting the vibration in the vertical direction; a line memory into which a video signal after the vibration in the vertical direction is written and from which the video signal is read out by a read clock of a frequency lower than that of the write clock, thereby performing an enlargement in the horizontal direction of the video signal; and a line memory control for line-locking the write clock and the read clock, for setting a frequency ratio of the write clock and the read clock in accordance with a magnification ratio in the horizontal direction, for shifting the reading position or writing position of the line memory, thereby correcting the vibration in the horizontal direction.

According to yet another aspect of the present invention, there is provided a video signal processing apparatus for correcting vibration in a video camera, comprising: a image pickup having a number of lines in the vertical direction that is greater than the number of lines of the television system to be output; a vibration amount detector for detecting vibration amounts in the horizontal and vertical directions; a high-speed transfer control for transferring the charges on the image pickup at high speed during a blanking period within a range of the number of surplus lines which is equal to the difference between the number of lines of the image pickup and the number of lines of the television system to be output in accordance with the vibration amount in the vertical direction obtained by the vibration amount detector and for correcting the vibration in the vertical direction; a line memory into which a video signal after the vibration in the vertical direction is written and from which the video signal is read out by a read clock of a frequency lower than that of the write clock, thereby performing an enlargement in the horizontal direction of the video signal; a line memory control for correcting the vibration in the horizontal direction by shifting a reading position or a writing position of the line memory; and a window setting circuit for setting a window to detect optical information and for correcting the position of the window in accordance with the vibration amount so as not to change the relative position for the video signal after the vibration has been corrected.

The above and other objects, features, and advantages of the present invention will become readily apparent from the following detailed description thereof, which is to be read in connection with the accompanying drawings.

DETAILED DESCRIPTION OF PREFERRED EMBODIMENTS

Figure 1:
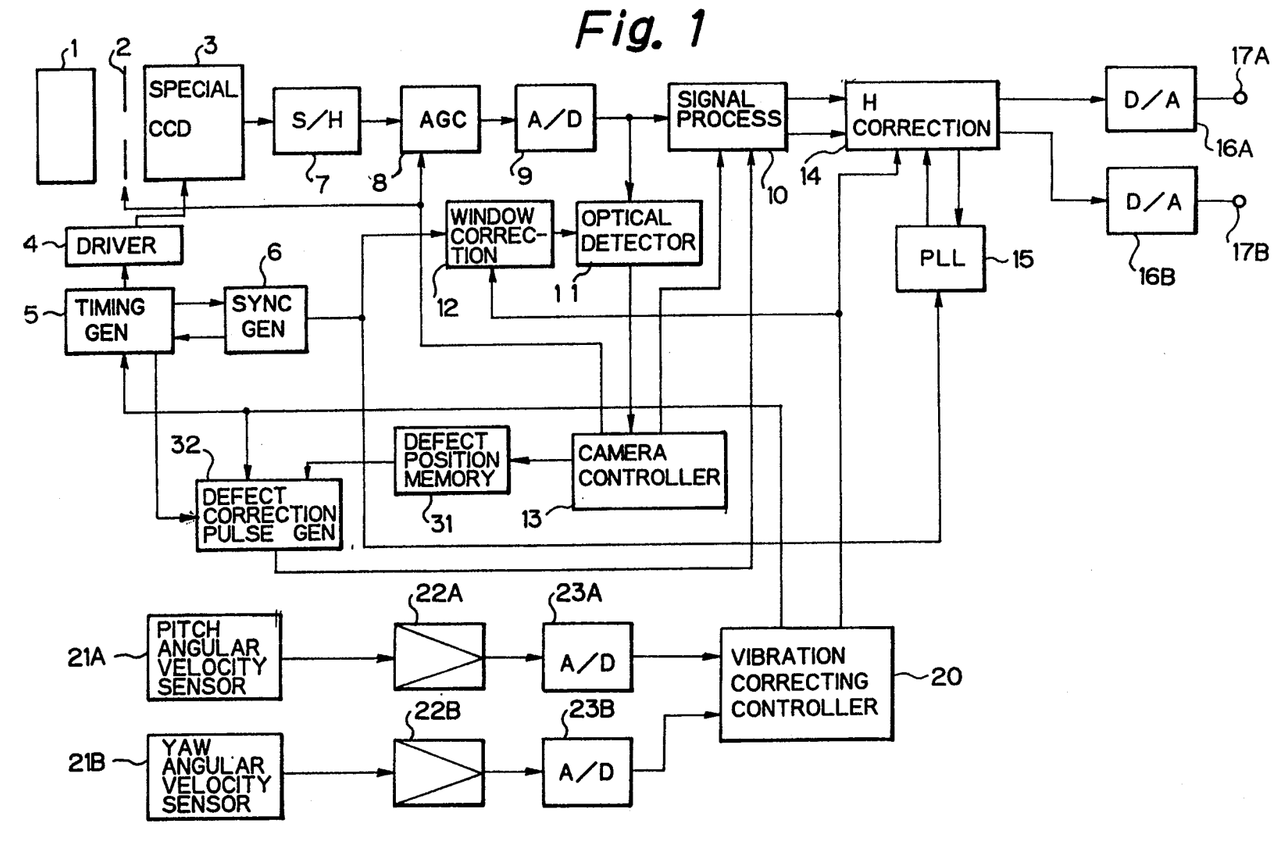
FIG. 1 is a general block diagram of a video camera to which the present invention is applied.

In the video camera of FIG. 1 the light of an object image obtained through a lens 1 is formed as an image on a photosensitive surface of a CCD image pickup device 3 after passing through an iris 2. Although the video camera is selected to perform recording following the NTSC standard system, in order to perform vibration correction the CCD image pickup device 3 is provided with a number of lines that is not equal to the number of lines of the NTSC system but, rather, is equal to the number of lines of the PAL system. That is, the number of lines of the CCD image pickup device 3 is selected such that there are 582 effective lines.

The CCD image pickup device 3 is driven by a driver 4 on the basis of a timing signal from a timing generating circuit 5. A sync signal is supplied from a sync generating circuit 6 to the timing generating circuit 5 and an output of a vibration correcting controller 20 is also supplied to the timing generating circuit 5. A high-speed transfer clock signal is fed to the CCD image pickup device 3 for a period of time equal to the vertical blanking interval in accordance with the vibration in the vertical direction of the camera.

According to an embodiment of the invention, pixel defects in the CCD image pickup device 3 are corrected, and the defect information of the CCD image pickup device 3 is stored in a defect position memory 31. An output of the defect position memory 31 is supplied to a defect correction pulse generating circuit 32 whose output is supplied to a signal processing circuit 10. At the position of the defective pixel, the output of the CCD image pickup device 3 is replaced to pixel data formed by interpolating the data of the adjacent pixels. Due to this, the defect correction is executed. As will be explained hereinafter in performing defect correction an address is shifted so that the defect position on the CCD image pickup device 3 corresponds to the position to correct position after the lines are shifted to perform vibration correction.

The output of the CCD image pickup device 3 is supplied to an analog-to-digital (A/D) converter 9 through a sample-and-hold circuit 7 and an automatic gain control (AGC) circuit 8. The image pickup signal is converted into a digital signal by the A/D converter 9 and an output of the A/D converter 9 is supplied to the signal processing circuit 10 and is also supplied to an optical detector circuit 11.

The signal processing circuit 10 executes necessary camera signal processing and forms a luminance signal and a chrominance signal corresponding to the NTSC system from the image pickup signal from the CCD image pickup device 3. The luminance signal and the chrominance signal from the signal processing circuit 10 are supplied to a horizontal correcting circuit 14.

The optical detector circuit 11 is provided to obtain information which is necessary for optical controls such as exposure control, focus control, white balance control, and the like. A window for obtaining this information is set by the optical detector 11 and a light level in the window is detected and a corresponding signal is supplied to a camera controller 13. The camera controller 13 controls the gain of the AGC circuit 8 and the opening size of the iris 2 in accordance with the light level signal, so that automatic exposure control is performed. The detection window is set by the optical detector 11 and an edge component level of the image pickup signal in the window is detected and supplied to the camera controller 13. The camera controller 13 controls the position of the lens 1, the lens position control mechanism is not shown, so that the edge component level is maximized. In this way, the automatic focus control is executed. The position of the window of the optical detector 11 can be moved by a window correction circuit 12.

According to an embodiment of the invention, the lines in the horizontal direction are enlarged by the line memory of the horizontal correcting circuit 14 and the reading position, or the writing position, in the line memory is shifted, thereby performing the vibration correction in the horizontal direction. When such a method is used, however, the position of the picture plane which is output does not coincide with the position of the picture plane photographed by the CCD image pickup device. Therefore, when the position of the window does not coincide with the position of the object due to the vibration correction, the light amount in the window changes but the photographed picture plane appears stationary due to the vibration correction.

Thus, a phenomenon occurs in which the brightness changes in spite of the fact that the picture plane is stationary. To overcome this, the invention provides a system whereby the position of the window of the optical detector 11 is shifted in accordance with a vibration correction amount.

The luminance signal and the chrominance signal from the signal processing circuit 10 are supplied to the horizontal correcting circuit 14, and the horizontal correction circuit 14 enlarges a signal of one line and shifts the reading position, thereby correcting the effects of vibration in the horizontal direction of the camera. The horizontal correcting circuit 14 is constructed by a line memory. A PLL 15 provides a synchronized read clock and write clock for the line memory. The reading and writing positions of the line memory forming the horizontal correction circuit 14 are controlled by the vibration correcting controller 20.

The luminance signal and chrominance signal from the horizontal correcting circuit 14 are supplied respectively to D/A converters 16A and 16B and the analog luminance signal and chrominance signal are generated by the D/A converters 16A and 16B and output from output terminals 17A and 17B.

The shaking of the video camera is detected by pitch and yaw angular velocity sensors 21A and 21B. That is, shaking in the vertical direction is detected by the pitch angular velocity speed sensor 21A, and an output of the pitch angular velocity speed sensor 21A is supplied to an A/D converter 23A through an amplifier 22A. An output of the A/D converter 23A is supplied to the vibration correcting controller 20. Shaking in the horizontal direction is detected by the yaw angular velocity sensor 21B and an output of the yaw angular velocity sensor 21B is supplied to an A/D converter 23B through an amplifier 22B. The output of the A/D converter 23B is also supplied to the vibration correcting controller 20.

The vibration correcting controller 20 controls a high-speed transfer of the CCD image pickup device 3 by a signal fed to timing generator 5 on the basis of shaking in the vertical direction as detected by the pitch angular velocity sensor 21A, thereby executing the vibration correction in the vertical direction. On the basis of shaking in the horizontal direction as detected by the yaw angular velocity sensor 21B, the read position (or writing position) of the line memory constructing the horizontal correcting circuit 14 is shifted, thereby performing the vibration correction in the horizontal direction.

Figure 2:
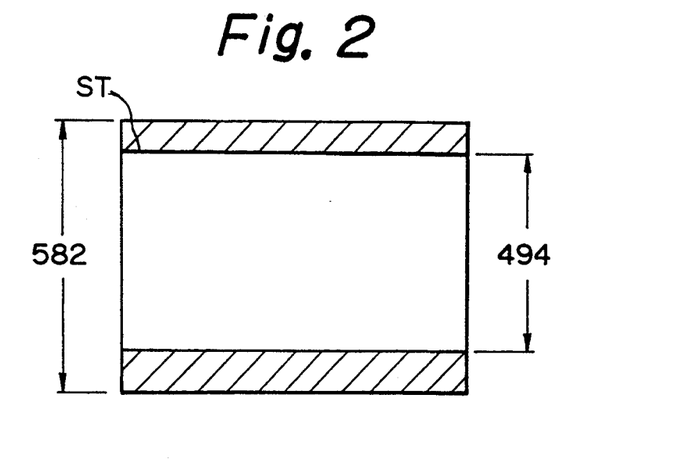
FIG. 2 is a representation of a CCD which is used in a video camera to which the invention is applied.

More specifically, as shown in FIG. 2 according to the embodiment of the invention the CCD image pickup device 3 is formed of a device in which the number of lines is in accordance with the PAL system, so that the number of effective lines is equal to 582. On the other hand, the number of effective lines of the NTSC system is usually taken to be 494 lines. Therefore, 494 lines are selected from among the 582 effective lines of one picture plane that are available in the CCD image pickup device 3. As shown by the upper and lower hatched regions in FIG. 2A, outputs of these extraneous lines are not used. The picture plane can be moved in the vertical direction by changing the start position ST. Therefore, by moving the start position ST so as to eliminate the shake in the vertical direction of the picture plane the vibration correction in the vertical direction can be executed.

FIGS. 3A–3F show the waveforms of the various signals applied to the CCD image pickup device 3. More specifically, a field identification pulse FLD (FIG. 3A), a vertical sync pulse VD (FIG. 3B), a horizontal sync pulse HD (FIG. 3C), sensor gate pulses XG1 and XG2 (FIGS.3D and 3E), and a transfer clock CK (FIG. 3F) are supplied to the CCD image pickup device 3.

A sensor gate pulse is supplied at a time point t1 and charges are transferred from each pixel of the CCD image pickup device 3 to the vertical transfer register by the sensor gate pulse. The charges are transferred by the transfer clock shown in FIG. 3F. In this instance, the signals of two pixels in the vertical direction are mixed and sent to the vertical transfer register. The reading position can be shifted by one-half line by a combination of the sensor gate pulses XGS1 and XGS2.

Figure 3A:
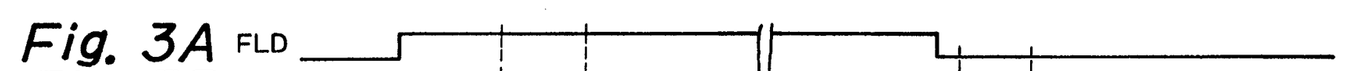
FIGS. 3A to 3F are waveform diagrams which are useful in explaining the video camera to which the present invention is applied.
Figure 3B:
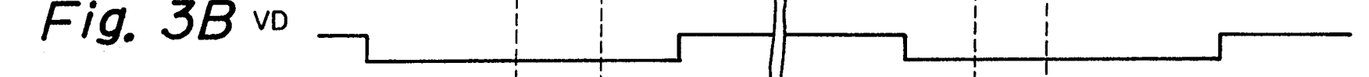
Figure 3C:
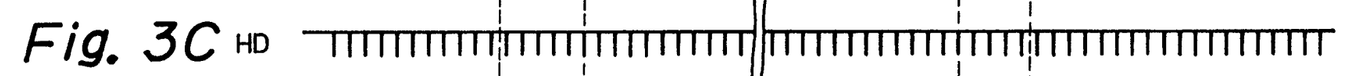
Figure 3D:
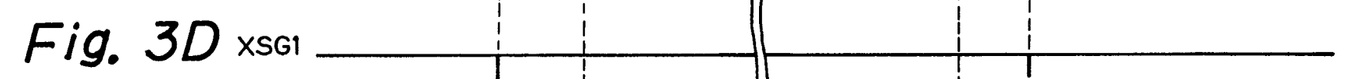
Figure 3E:
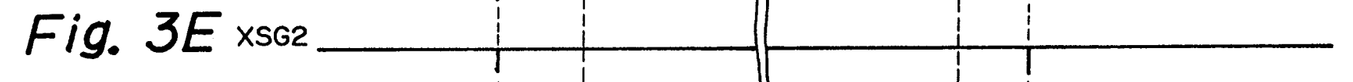
Figure 3F:
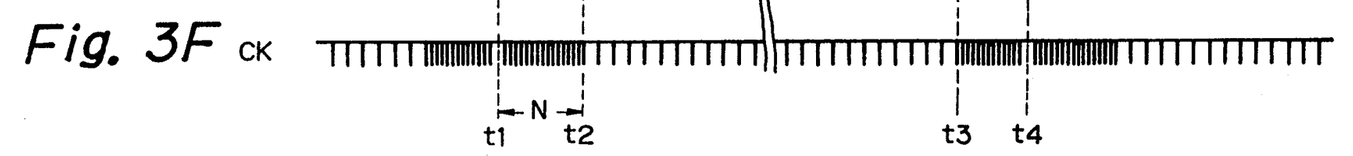

As shown by the frequency of the clock pulses in FIG. 3F, N lines of the CCD image pickup device 3 are transferred at a high speed. Although these N lines of the CCD image pickup device 3 are transferred at a high speed, the other lines of the CCD image pickup device 3 are transferred at the normal transfer speed starting from time point t2. The CCD image pickup device 3 is then again transferred at a high speed from time point t3. The total number of lines which have been transferred for a period of time from time point t1 to time point t4 corresponds to the number of lines of the PAL system, as represented in FIG. 2. The number of lines for a period of time from time point t2 to time point t3 corresponds to the number of lines of the NTSC system, as represented by the middle open area in FIG. 2. The position in the vertical direction of the picture plane can be changed by the number N of lines which are transferred at a high speed. By setting the number N of lines which are vertically transferred in accordance with the shake in the vertical direction of the video camera, the vibration correction in the vertical direction is executed.

Figure 4:
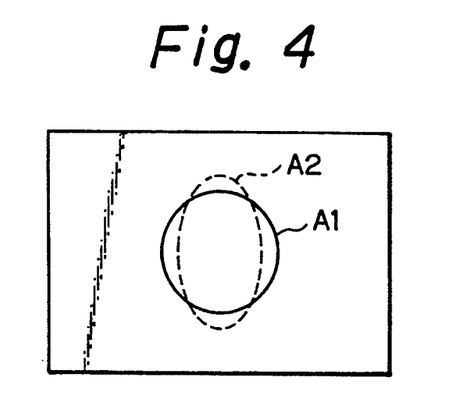
FIG. 4 is a representation of a CCD which is useful in explaining the video camera to which the invention is applied.

Among the 582 effective lines of the CCD image pickup device 3 according to the PAL system, the charges of the 494 effective lines according to the NTSC system are transferred at a normal speed. The charges of remaining lines are transferred at a high speed. As a consequence of this two-speed charge transfer, a circular object A1 will be displayed as a vertically elongated circular image A2, as shown in FIG. 4.

Figure 5A:
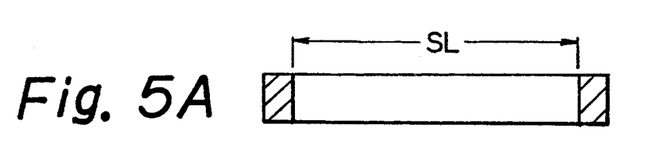
FIGS. 5A and 5B are representations of a portion of a CCD which are useful in explaining the video camera to which the invention is applied.
Figure 5B:
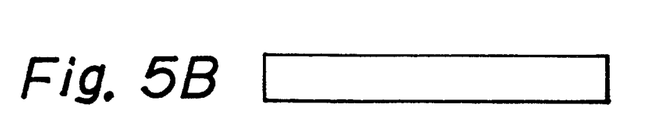

In regard to the horizontal vibration correction, a signal SL of one line is stored in the line memory 14, as shown in FIG. 5A. As shown in FIG. 5B, the time base of such a signal is converted and the resultant signal is read out. By performing this time base conversion, a ratio of the vertical and lateral lengths of the image which is displayed is corrected and the picture plane is enlarged in the horizontal direction. By shifting the reading position of the line memory in accordance with the shake of the video camera in the horizontal direction the vibration correction can be performed.

In the video camera to which the invention is applied, as mentioned above, the CCD image pickup device 3 transfers the charges at a high speed during the vertical blanking period and sweeps out at a high speed. Therefore, considerably large charges flow from the vertical transfer register into the horizontal transfer register of the CCD image pickup device 3. Therefore, when a strong light is irradiated onto the CCD image pickup device 3, the charge amount will exceed the capacity of the horizontal transfer register and the overflow charges can easily flow in reverse to the vertical transfer register side.

Figure 6:
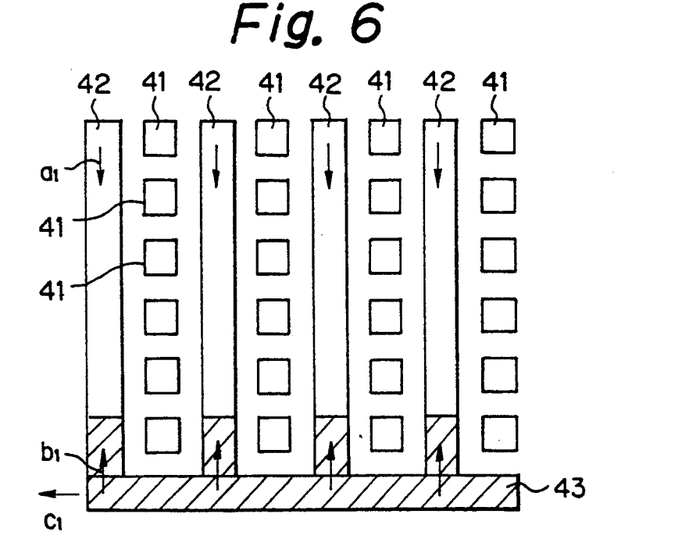
FIG. 6 is a schematic of explain a CCD image pickup device of the video camera to which the invention is applied.

This is shown in FIG. 6, in which the photoelectric converting devices 41 are two-dimensionally arranged to form the pixels of the ordinary CCD image pickup device. In each of the photoelectric converting devices 41, the incident light is photoelectrically converted and the charges are supplied from the photoelectric converting devices 41 to a vertical transfer register 42. As represented by arrow a1, the charges are transferred by the vertical transfer register 42 and sent to a horizontal transfer register 43. The charges are transferred, as represented by arrow c1, by the horizontal transfer register 43 and are output to the appropriate circuitry of the video camera.

When a large amount of charges are sent to the horizontal transfer register 43 through the vertical transfer register 42, the charges of the horizontal transfer register 43 will overflow. As represented by arrow b1, these overflow charges then flow in reverse from the horizontal transfer register 43 to the vertical transfer register 42.

Figure 7:
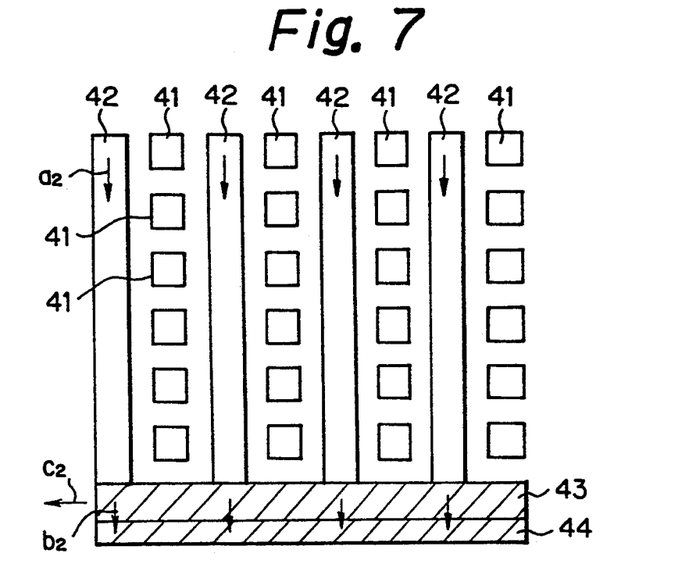
FIG. 7 is a schematic of explain of a CCD image pickup device of the video camera according to an embodiment of the present invention.

According to an embodiment of the present invention, as shown in FIG. 7, a drain device 44 is provided in parallel with the horizontal transfer register 43. In operation of this embodiment, the charges from the photoelectric converting device 41 of each pixel are supplied to a vertical transfer register 42 and the charges are transferred from the vertical transfer register 42, as represented by arrow a2 to a horizontal transfer register 43. The charges are transferred from the horizontal transfer register 43, as represented by arrow c2, and output to the other circuitry of the video camera.

Figure 8:
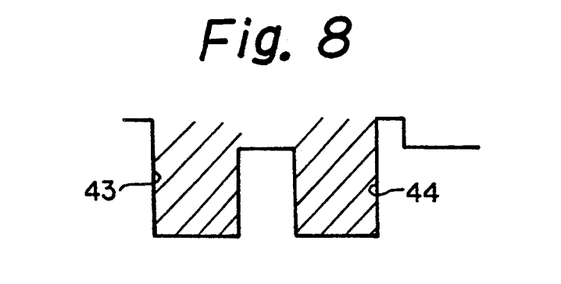
FIG. 8 is a representation of the CCD image pickup device of the video camera of FIG. 7 shown in more detail.

Now, assuming that a large amount of charges are transferred to the horizontal transfer register 43 through the vertical transfer register 42, the charges of the horizontal transfer register 43 will overflow as explained above. In this embodiment, however, the overflow charges flow into the drain 44 arranged in parallel with the horizontal transfer register 43, as shown in FIG. 8. Therefore, it is possible to prevent the overflow charges from flowing in reverse from the horizontal transfer register 43 to the vertical transfer register 42.

According to the embodiment of the invention, as shown in FIGS. 5A and 5B, the time base in the horizontal direction is changed by the horizontal correcting circuit 14 and the picture plane in the horizontal direction is enlarged. In such a time-base conversion, the same data is repetitively read out from the line memory without changing the write clock and read clock and the data during such a period of time can be easily interpolated by management of the clock signals. When such a method is used, however, because interpolation of the data is necessary a deterioration of the picture quality due to the interpolation filter occurs.

Figure 9:
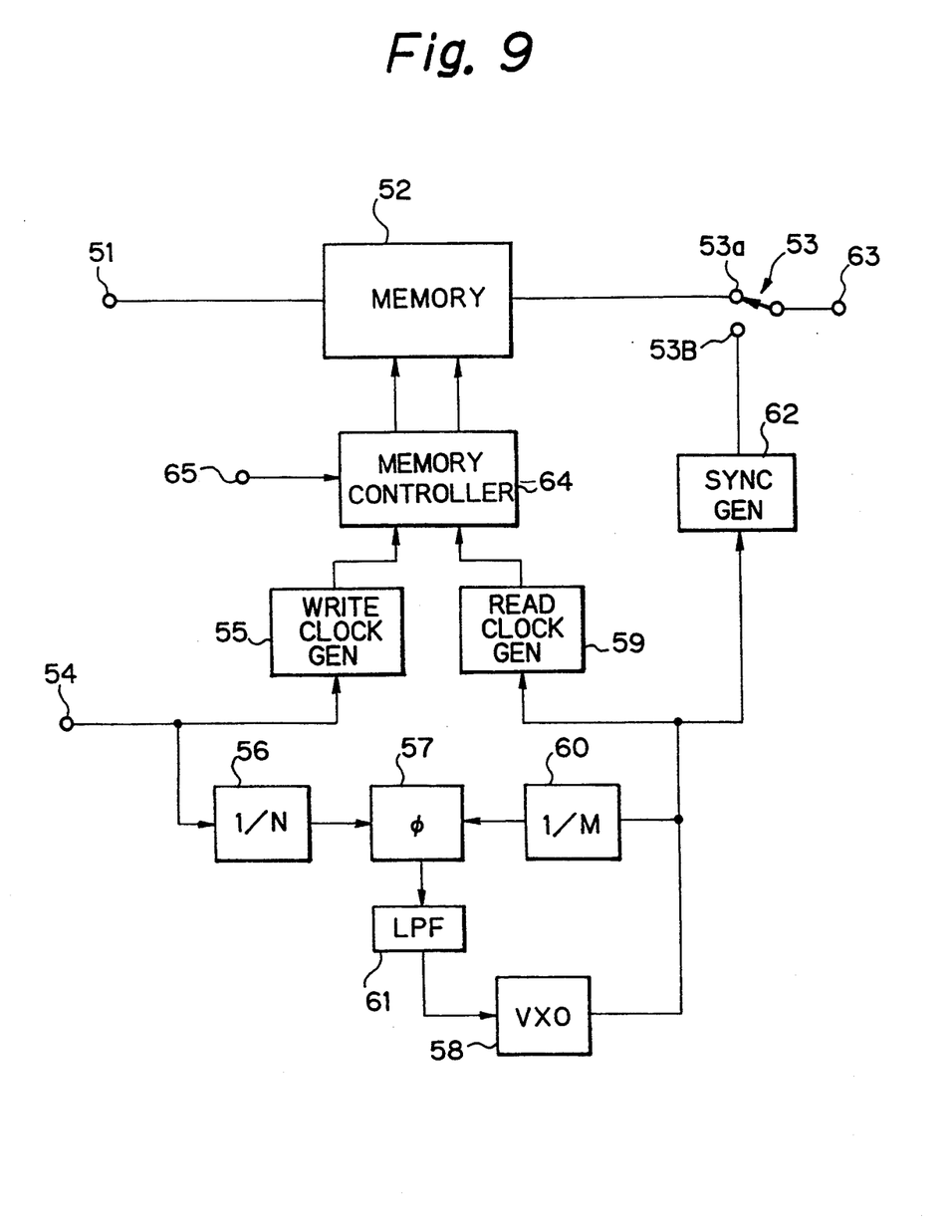
FIG. 9 is a block diagram explain the vibration correction system for the horizontal direction of the video camera according to an embodiment of the present invention.

According to an embodiment of the present invention, time-base conversion is executed by changing the frequencies of the clocks in the writing and reading operation. FIG. 9 shows an example of the horizontal correcting circuit 14 to which the invention is applied. in FIG. 9, a video signal (luminance or chrominance) is supplied to an input terminal 51 and fed to a line memory 52. An output of the line memory 52 is supplied to a terminal 53A of a switching circuit 53.

A horizontal clock signal of frequency fH is supplied to an input terminal 54 and fed to a write clock generating circuit 55 and to a 1/N frequency dividing circuit 56. The output of the 1/N frequency dividing circuit 56 is supplied to a phase comparing circuit 57 that produces an output fed to a voltage controlled oscillator (VXO) 58 through a low pass filter 61. The output of the VXO 58 is supplied to a read clock generating circuit 59 and to a sync generating circuit 62 and is also supplied to a 1/M frequency dividing circuit 60. The output of the 1/M frequency dividing circuit 60 is supplied to the other input of the phase comparing circuit 57. In the phase comparing circuit 57, the phase of the clock signal that has been frequency divided by 1/N is compared with the phase of the output of the VXO 58 that has been frequency divided by 1/M. On the basis of this phase comparison, the oscillating frequency of the VXO 58 is controlled.

A phase-locked loop (PLL) is constructed by the frequency dividing circuits 56 and 60, the VXO 58, and the phase comparing circuit 57. The write clock and read clock of different frequencies can be formed by the PLL and, moreover, because the PLL is constructed as described above, the write clock and read clock are line-locked.

The output of the write clock generating circuit 55 and the output of the read clock generating circuit 59 are supplied to a memory controller 64. A shift amount in the horizontal direction is also supplied to an input terminal 65 of the memory controller 64. The memory controller 64 controls the writing and reading operations of the line memory 52 by the write clock signal from the write clock signal generating circuit 55 and the read clock from read clock generating circuit 59. A frequency ratio of the write clock and read clock is determined by the frequency dividing ratio N of the frequency dividing circuit 56 and the frequency dividing ratio M of the frequency dividing circuit 60. Therefore, the time-base conversion is realized, and the line in the horizontal direction is enlarged. The reading position, or writing position, of the enlarged line is changed in accordance with a shift amount from the input terminal 65. Thus, the vibration correction in the horizontal direction is executed.

The output of the sync generating circuit 62 is supplied to a fixed terminal 53B of a switching circuit 53. The switching circuit 53 is switched to the other fixed terminal 53A connected to the output of line memory 52 for a video signal period of time. More specifically, the switching circuit 53 is switched from the terminal 53A side to the terminal 53B side at a timing of a sync signal and an output of the switching circuit 53 is taken out from an output terminal 63.

Defective pixels are almost invariably included in the large number of pixels forming the CCD image pickup device 3. As described above, the position information of the defective pixels is accumulated into the defect position memory 31 and processes, such as interpolation and the like, are executed at the positions of the defective pixels, thereby coping with the defective pixels.

Figure 10A:
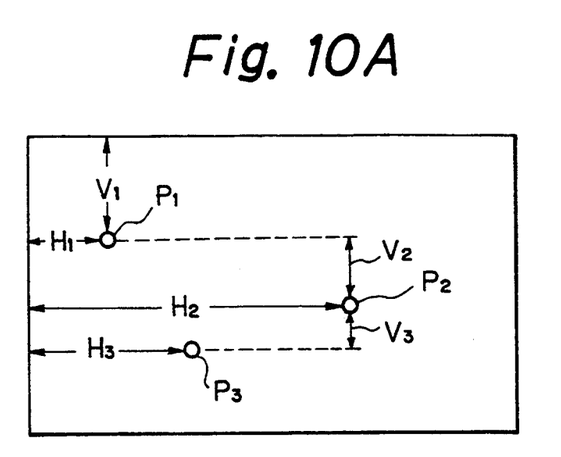
FIGS. 10A and 10B are representations of a video frame which useful in explaining the correction of pixel defects of the video camera according to an embodiment of the present invention.

According to an embodiment of the present invention, as represented by the CCD image pickup device in FIG. 10A, the addresses of the defective pixels $P_1$, $P_2$, $P_3$ are stored in the defect position memory 31. The addresses (Hn, Vn) are set to the absolute addresses ($H_1$, $V_1$) with respect to the first defect P1 and are set to the absolute addresses ($H_2$, $H_3$) with respect to the horizontal direction with regard to the subsequent defects $P_2$ and $P_3$, respectively, and are set in the relative addresses ($V_2$, $V_3$) from the positions of the preceding defect pixels with regard to the vertical direction.

Figure 11:
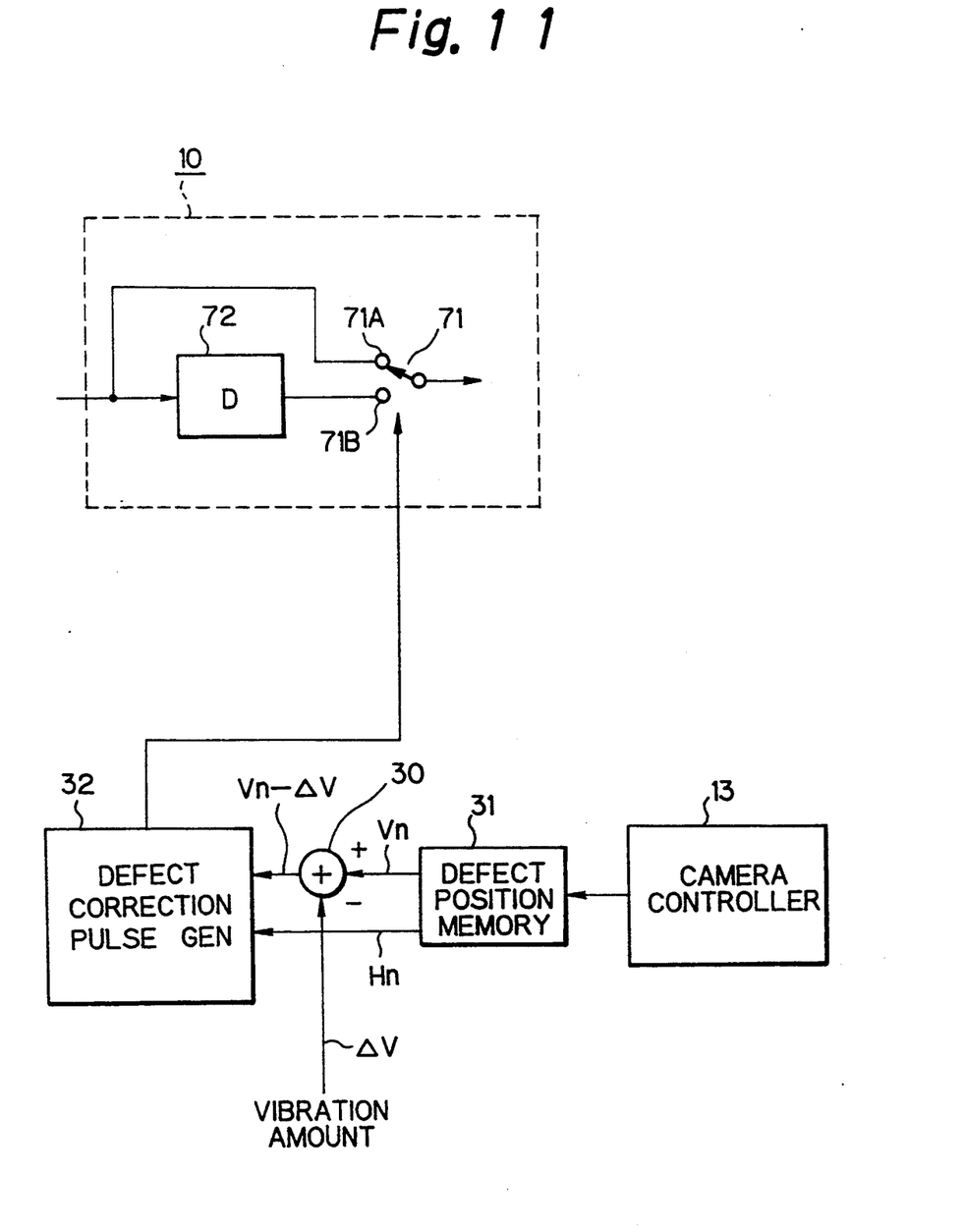
FIG. 11 is a block diagram of a system for the correction of defects of the video camera according to an embodiment of the present invention.

As shown in the circuit of FIG. 11, the addresses (Hn, Vn) of the defect positions are output from the defect position memory 31. The addresses (Hn, Vn) are supplied to the defect correction pulse generating circuit 32. A vibration amount ΔV in the vertical direction is supplied from the vibration correction controller 20 to the minus input of a signal summer 30 where it is subtracted from the vertical address Vn before being fed to the defect correction pulse generating circuit 32. Thus, the addresses (Hn, Vn−ΔV) which have been shifted in accordance with the vibration amount are formed.

Figure 10B:
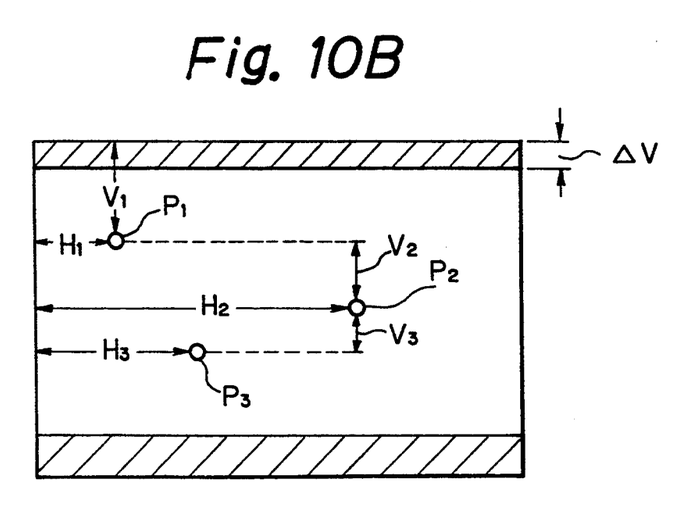

A defect correction pulse is generated at each position corresponding to the addresses (Hn, Vn−ΔV) and a switching circuit 71 in the signal processing circuit 10 is controlled by the defect correcting pulses. That is, in case of a normal pixel, the switching circuit 71 is set to a terminal 71A side. When the defect correction pulse is generated, the switching circuit 71 is switched to a terminal 71B side, and the pixel data that has been interpolated by a delay circuit 72 is output from the switching circuit 71. By adjusting the vertical addresses of all defective pixels by the amount of shift needed to correct for camera vibrations, as mentioned above, as shown in FIGS. 10B and 10C, the pixel defects can be accurately corrected along with the vibration correction.

Figure 12:
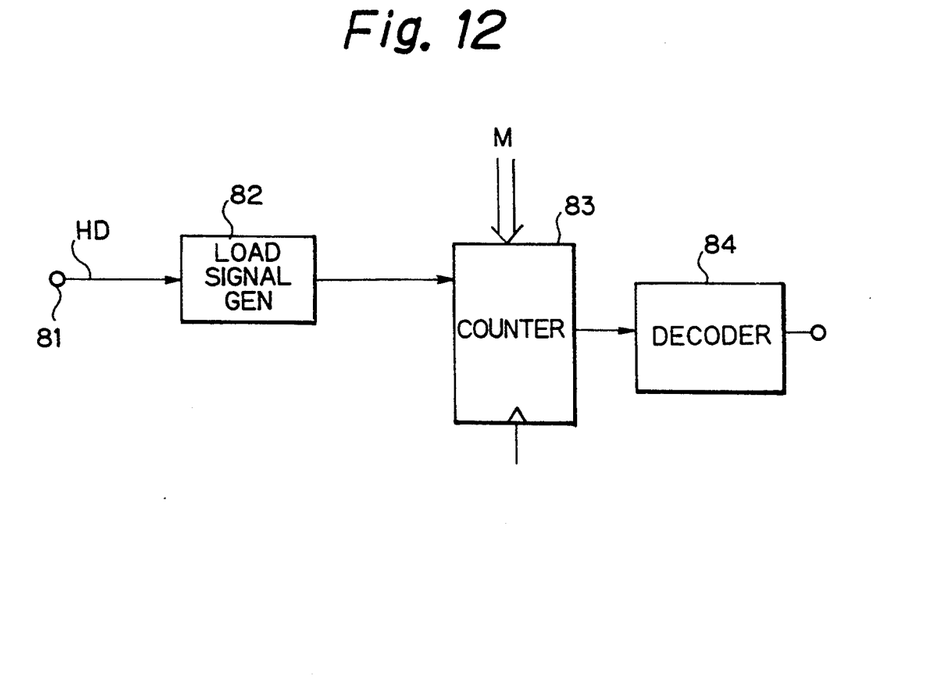
FIG. 12 is a block diagram of a system for setting of a window for optical detection of the video camera according to an embodiment of the present invention.
Figure 13A:
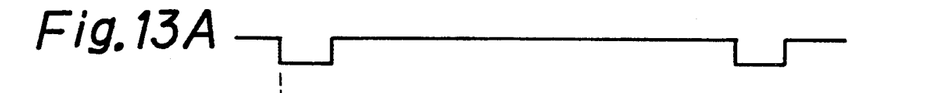
FIGS. 13A to 13D are waveform diagrams which are useful in explaining the setting of the window for /ptical detection of the video camera as shown in FIG. 2.
Figure 13B:
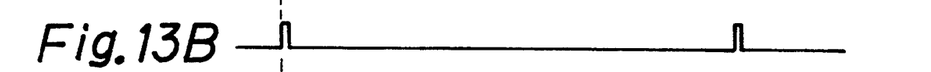
Figure 13C:
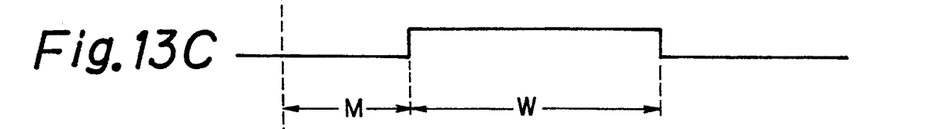
Figure 13D:
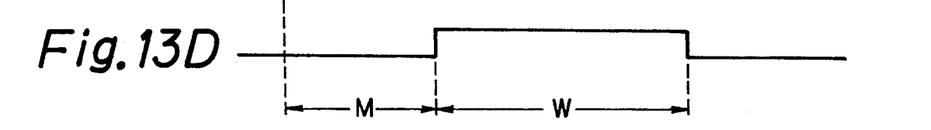

As described above, the position of the window of the optical detector 11 can be moved by the window correcting circuit 12 in correspondence to a shift amount of the picture plane in the horizontal direction. That is, as shown in FIG. 12, a horizontal sync pulse HD (FIG. 13A) is fed in at an input terminal 81 to a load signal generating circuit 82, which generates a load pulse signal as shown in FIG. 13B, that is supplied to the counter 83. The counter 83 loads a value M in response to the pulses in load signal. The value M is set in accordance with the vibration amount in the horizontal direction and is counted by the counter 83 and the count output of the counter 83 is supplied to a decoder 84. The position of a window W is determined by the decoder 84 on the basis of an output of the counter 83. The position of the window W is shifted in accordance with the value M which is loaded into the counter 83, namely, in accordance with the vibration amount as shown in FIGS. 13A and 13B.

Figure 14A:
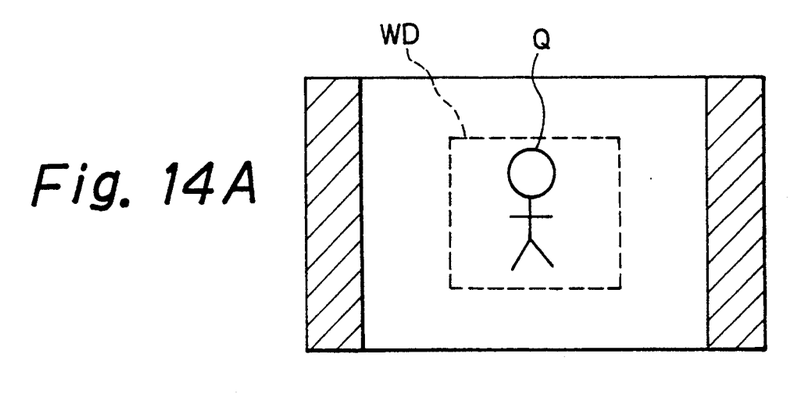
FIGS. 14A to 14C are representations of a video frame which are useful in explaining the setting of the window for optical detection of the video camera as shown in FIG. 12.
Figure 14B:
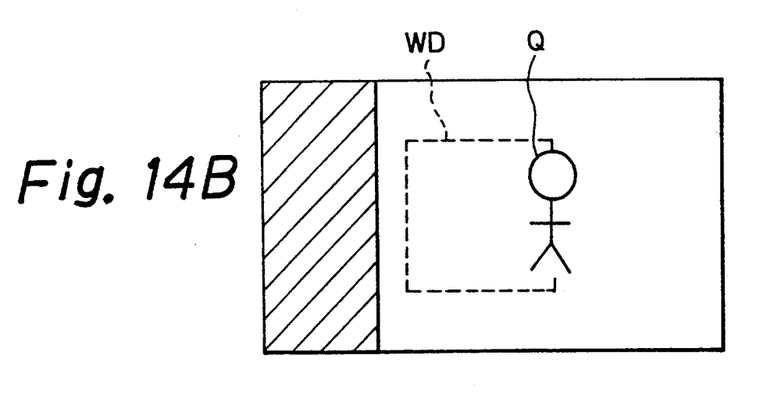

As described above, because the position of the window of the optical detector 11 is shifted in accordance with the vibration correction amount, there is a problem such that a phenomenon occurs in which the brightness is changed in spite of the fact that the picture plane is stationary. If it is assumed that, as shown in FIG. 14A, that vibration occurs in a state in which the position of an object Q coincides with the position of the window WD, and the position on the picture plane is corrected by performing vibration correction in accordance with an embodiment of the present invention. In this example as shown in FIG. 14B, the actual picture plane does not move to perform the necessary vibration correction, however, the result of the vibration correction is that the position of the window WD does not coincide with the position of the object Q. Therefore, the light amount in the window changes, although the photographed picture plane is stationary, due to the vibration correction and the whole brightness changes, thereby affecting the automatic focus control, the automatic exposure controls and the white balance control.

Figure 14C:
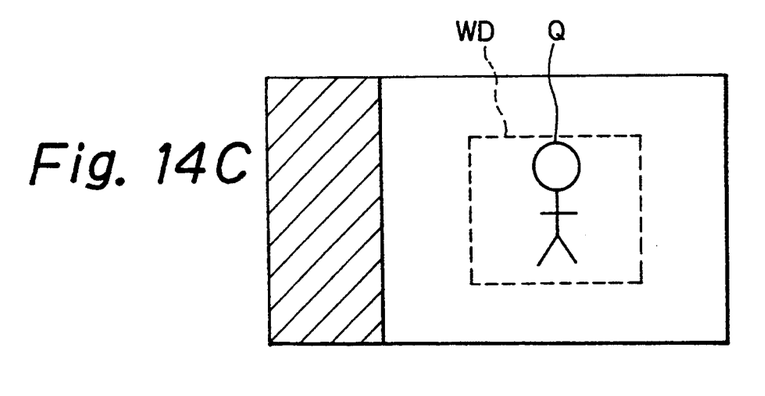

To solve the problem according to an embodiment of the present invention, as shown in FIG. 14C, the position of the window WD is shifted in accordance with the vibration amount, so that the position of the object Q coincides with the position of the window WD. Thus, the brightness detected in window WD does not change.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

For example, according to an embodiment of the present invention, the image pickup signal of the NTSC system is output by using a CCD image pickup device that has the number of lines corresponding to the PAL system. Nevertheless, any image pickup device can be used so long as the number of lines of the image pickup device is greater than the number of lines of the image pickup signal to be output. In case the output of the image pickup signal is to be of the PAL system, a special image pickup device is used in which the number of lines is equal to 697, for example.

According to the invention, an image pickup device is used in which the number of lines is greater than the number of lines of the image pickup signal to be /utput and the vibration correction is executed by shifting the screen vertically using the surplus lines, so that the picture quality does not deteriorate. Because there is no need to add a mechanism to move a prism or the like, miniaturization and light weight of a video camera can be realized.

As another feature of the invention, because the drain is arranged in parallel with the vertical transfer register of the image pickup device, it is possible to prevent the overflow charges from flowing in reverse flow the vertical transfer register of the image pickup device. In addition, because the position of the defective pixel in the memory is shifted in accordance with the vibration amount, the information of the defective pixel can be made to correspond to the shifted position to perform defective pixel interpolation.

According to the invention, because the line is enlarged in the horizontal direction without using any interpolation filter, the picture quality does not deteriorate. Moreover, because the position of the window used to obtain optical information for camera control purposes is changed in accordance with the vibration amount, the optical information is adapted to the photographed picture plane and the problem such that the whole brightness changes in spite of the fact that the picture plane is stationary is overcome.

What is claimed:

1. A video signal processing apparatus for correcting vibration in a video camera producing video output signals in accordance with a known television system standard, the apparatus comprising:

image pickup means having a plurality of pixels forming a number of lines in a vertical direction that is greater than a number of lines in the known television system standard and thereby producing a number of surplus lines, at least some of said pixels at known positions in said image pickup means are defective;

vibration detecting means for detecting an amount of mechanical vibration in the vertical direction of the video camera;

high-speed transfer control means for transferring charges of said image pickup means at a high speed during a video blanking period within a range of the number of surplus lines equal to a difference between the number of lines of said image pickup means and the number of lines of the television standard system, in response to the vibration amount in the vertical direction obtained by said vibration detecting means and for correcting the vibration in the vertical direction;

memory means for storing position information of each of the defective pixels in said image pickup means; and defect correcting means for correcting defective pixel positions in accordance with said defective pixel position information and the number of lines which are transferred at a high speed for a vibration correction, wherein said image pickup means includes a horizontal transfer register and a vertical transfer register and further comprising:

a charge back-flow preventing device arranged in parallel with said horizontal transfer register of said image pickup means for preventing a reverse flow of charges to said vertical transfer register upon high-speed transfer of said image pickup means.

2. A video signal processing apparatus for correcting vibration in a video camera producing video output signals in accordance with a known television system standard, the apparatus comprising:

image pickup means having a plurality of pixels forming a number of lines in a vertical direction that is greater than a number of lines in the known television system standard and thereby producing an output having a number of surplus lines, at least some of said pixels at known positions in said image pickup means are defective, wherein said image pickup device means includes a horizontal transfer register and a vertical transfer register;

vibration detecting means for detecting an amount /f mechanical vibration in the vertical direction of the video camera;

high-speed transfer control means for transferring charges of said image pickup means at a high speed during a video blanking period within a range of the number of surplus lines equal to a difference between the number of lines of said image pickup means and the number of lines of the television standard system, in response to the vibration amount in the vertical direction obtained by said vibration detecting means and for correcting the vibration in the vertical direction;

memory means for storing position information of each of the defective pixels in said image pickup means;

defect correcting means for correcting defective pixel positions in accordance with said defective pixel position information and the number of lines which are transferred at a high speed for a vibration correction; and a charge back-flow preventing device arranged in parallel with said horizontal transfer register of said image pickup means for preventing a reverse flow of charges to said vertical transfer register upon high-speed transfer of said image pickup means, wherein said vibration detecting means detects mechanical vibration amounts in both the horizontal and vertical directions, and said defect correcting means corrects the positions of the defective pixels in accordance with the defect position information and the vibration amounts in the vertical and horizontal directions and further includes line memory means containing a video signal having vibration in the vertical direction corrected, said line memory means being written to by a write clock signal and read out by a read clock signal, in which said read clock signal has a frequency lower than a frequency of said write clock signal, thereby performing an enlargement in the horizontal direction of the video signal, and line memory control means for correcting the vibration in the horizontal direction by shifting the reading position or writing position of said line memory in accordance with the detected vibration amount in the horizontal direction.

* * * * *

UNITED STATES PATENT AND TRADEMARK OFFICE
CERTIFICATE OF CORRECTION

PATENT NO. : 5,396,286

DATED : March 7, 1995

INVENTOR(S) :
Shigeki Ishizuka

It is certified that error appears in the above-indentified patent and that said Letters Patent is hereby corrected as shown below:

On the title page, under item [56],
In <u>Foreign Patent Documents</u>, Patent 0454354, change
      "10/1990" to --10/1991--
Col. 1, line 36, change "/f" to --of--
Col. 5, lines 40 & 41, change "/ptical" to --optical--
      line 41, change "FIG. 2" to --FIG. 12--
Col. 12, line 26, change "/utput" to --output--

<u>In the claims</u>:

Col. 13, line 40, change "/f" to --of--

Signed and Sealed this

Ninth Day of January, 1996

Attest:

BRUCE LEHMAN

*Attesting Officer*    *Commissioner of Patents and Trademarks*